2,909,556
Patented Oct. 20, 1959

2,909,556
HYDRAZIDES
Samuel Allen Heininger, Dayton, Ohio, assignor to Monsanto Chemical Company, St. Louis, Mo., a corporation of Delaware
No Drawing. Application January 27, 1956
Serial No. 561,934
16 Claims. (Cl. 260—461)

This invention relates to a method of preparing acyl 2-(2-cyanoalkyl)hydrazides and to certain novel classes of compounds provided thereby.

It has been known hitherto to prepare aracylhydrazonitriles which have the formula

wherein $R_1$ represents an aracyl radical such as benzoyl or benzenesulfonyl, $R_2$ represents a hydrocarbon radical, and $R_3$ represents a hydrocarbon radical or hydrogen. These aracylhydrazonitriles are prepared from aracylhydrazones, of the formula $$R.NHN{=}CR_2R_3$$

where $R_1$, $R_2$, and $R_3$ have the above significance. On addition of HCN, these hydrazones give gem-hydrazonitriles of the formula shown above, wherein the cyano radical of the nitrile is attached to the same carbon atom as is attached to one of the hydrazo nitrogen atoms.

I have now unexpectedly found that acyl hydrazides readily add across the double bond of $\alpha,\beta$-olefinic nitriles, giving novel acylhydrazonitriles wherein the cyano radical is attached to a carbon atom alpha to the carbon atom attached to the hydrazo group.

In accordance with the present invention, an acyl hydrazide is reacted with an $\alpha,\beta$-olefinic nitrile to produce the present novel acyl 2-(2-cyanoalkyl)hydrazides as illustrated by the following equation:

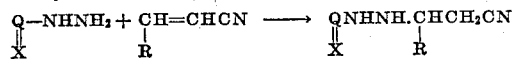

where R is selected from the class consisting of hydrogen atoms and the methyl radical and

represents an organic acyl radical, terminated by a non-metallic element which is in turn doubly bonded to an atom of a non-metallic element of group VIa having an atomic weight below forty, i.e., oxygen or sulfur.

The $\alpha,\beta$-olefinic nitriles useful in the present process comprise acrylonitrile and crotononitrile.

By the term "organic acyl" is herein denoted the radical form by removal of one or more hydroxy groups from an acid or acid derivative containing at least one carbon atom. The acyl radicals which may be attached to the hydrazino radical in the presently useful hydrazides include both acyl radicals terminating in carbonyl and thiocarbonyl radicals, and also acyl radicals terminating in a non-metallic element other than carbon, which is doubly bonded to oxygen or sulfur, and which is in addition linked to a carbon atom, either directly, as in sulfonic acids, or indirectly, i.e., through an intervening element such as oxygen, as in esters of phosphorus acids. Thus the term "acyl" is used herein in its generic sense.

The class of presently useful acyl hydrazides wherein the terminal atom of the acyl radical, doubly bonded to oxygen or sulfur, is a carbon atom includes carbonic and thiocarbonic acid hydrazides, such as carbazic acid, semicarbazide, and thiosemicarbazide. Hydrazides of organic carboxylic acids, containing more than one carbon atom, are also useful in the process of the invention; organic carboxylic acid hydrazides which may be used in the present process include the hydrazides of alkyl, cycloalkyl, heterocyclic, aryl, aralkyl, and alkaryl carboxylic acids, unsubstituted, or substituted by any of a wide variety of substituent groups which are inert under the present reaction conditions. The organic carboxylic acid hydrazides are readily prepared, for example, by the reaction of hydrazine with an alkyl ester of the corresponding acid.

Typical of aliphatic acid hydrazides which may be cyano-alkylated by the process of the invention to give the present novel 2-(2-cyanoalkyl)hydrazides are, e.g., acetyl hydrazide, butyryl hydrazide, isovaleryl hydrazide, $\gamma$-methylvaleryl hydrazide, $\alpha$-ethyl-$\gamma$-methylvaleryl hydrazide, lauroyl hydrazide, stearoyl hydrazide, etc., as well as substituted aliphatic acid hydrazides such as chloroacetyl hydrazide, cyanoacetyl hydrazide, isonitroso-cyanoacetyl hydrazide, nitrocyanoacetyl hydrazide, isoamylcyanoacetyl hydrazide, ethoxyacetyl hydrazide, benzyloxyacetyl hydrazide, $\gamma$-phenoxybutyryl hydrazide, 2,4-dichlorophenoxyacetyl hydrazide, potassium methyl malonohydrazidate, etc.

Olefinic carboxylic acid hydrazides which may be used in the present process include, e.g., crotonyl hydrazide, 3-butenoyl hydrazide, hydrosorbyl hydrazide, acrylyl hydrazide, etc.

Exemplary of presently useful alicyclic acid hydrazides are dicyclopentylacetyl hydrazide, bicyclo[2.2.1]heptene 2-carbonyl hydrazide and bornylene-3-carbonyl hydrazide.

The class of aralkyl and aralkenyl acid hydrazides which may be cyanoalkylated to give the novel product of the above formula includes, e.g., phenylacetyl hydrazide, p-chlorophenylacetyl hydrazide, p-nitrophenylacetyl hydrazide, $\alpha$-benzamido-$\beta$-phenylpropionyl hydrazide, $\beta$-phenylpropionyl hydrazide, $\beta$-hydroxy-$\beta$-phenylpropionyl hydrazide, a-benzamido-$\beta$-phenylpropionyl hydrazide, $\beta$-1-naphthylpropionyl hydrazide, 2-methoxy-9,10-dihydro 7-phenanthrenepropionyl hydrazide, triphenylacetyl hydrazide, bis(p-hydroxyphenyl)acetyl hydrazide, m-nitro cinnamoyl hydrazide, $\beta$-styrylacrylyl hydrazide, potassium benzylmalonohydrazidate, benzylcyanoacetyl hydrazide, etc.

Examples of aromatic acid hydrazides useful in the present process are benzoyl hydrazide, o-toluyl hydrazide, ethyl terephthalohydrazidate, m-chlorobenzoyl hydrazide, 2,6-dibromo-4-methylbenzoyl hydrazide, p-iodobenzoyl hydrazide, 2-nitrophthalohydrazidic acid, 3,5-dinitro-methylbenzoyl hydrazide, anisoyl hydrazide, veratroyl hydrazide, salicyloyl hydrazide, N-methyl-N-acetyl anthranoyl hydrazide, $\alpha$-naphthoyl hydrazide, 4-methyl-naphthoyl hydrazide, 5,8-dibromo-2-naphthoyl hydrazide 3-methoxy-2-naphthoyl hydrazide, 9-phenanthreneca bonyl hydrazide, 2,3,4,6-tetramethoxy-9-phenanthren carbonyl hydrazide, pyrene-4-carbonyl hydrazide, etc.

Useful heterocyclic carboxylic acid hydrazides for tl present invention include, e.g., 2-(p-methoxyphenyl)-pyrrolepropionyl hydrazide, 2,4-dimethyl-3-ethylpyrrol 5-carbonyl hydrazide, 2,4-dimethyl-3-cyanopyrrole-carbonyl hydrazide, 5,7-dinitroindole-2-carbonyl h drazide, 2-methyl-3-furoyl hydrazide, benzodihydrofura 2-carbonyl hydrazide, 2-phenyl-5-thiophenepropion hydrazide, thiophene-2-carbonyl hydrazide, 5-imidazo acetyl hydrazide, imidazole-4-carbonyl hydrazide, methylnicotinoyl hydrazide, 4-chlorpicolinoyl hydrazic 2-phenyl-6-methoxycinchoninyl hydrazide, etc.

Another class of acyl hydrazides in which the acyl ra ical terminates in a carbonyl radical comprises the l drazides of carbamic acids, which may be prepared fr the corresponding carbamyl chlorides and hydrazine, 1 example. As exemplary of presently useful carbamyl l drazides may be listed, e.g., methylcarbamyl hydrazi dimethylcarbamyl hydrazide, diisoamylcarbamyl hyd zide, phenylcarbamyl hydrazide, diphenylcarbamyl hyd zide, N-phenyl-N-α-naphthylcarbamyl hydrazide, etc. Exemplary of corresponding thiocarbamyl hydrazides which may be used in the present process are, e.g., methylthiocarbamyl hydrazide, dimethylthiocarbamyl hydrazide, allylthiocarbamyl hydrazide, phenylthiocarbamyl hydrazide, p-tolylthiocarbamyl hydrazide, etc. Other available acyl hydrazides, carrying non-interfering substituents, e.g., isopropyl(2-methyl-2-nitropropyl)carbamyl hydrazide, are also useful in the process of the invention.

Another class of presently useful acyl hydrazides wherein the acyl radical contains at least one carbon atom is the class of sulfonyl hydrazides, of the formula $RSO_2NHNH_2$ wherein R represents, e.g., alkyl, aralkyl, aryl, cycloalkyl, or alkaryl radicals or derivatives of such radicals, e.g., radicals containing non-interfering substituents such as nitro, cyano, or halogen radicals, etc.; R in the above formula of a sulfonyl hydrazide may also represent a nitrogen atom, substituted by and organic radical, e.g., dialkylamino, acylamido, etc. The preparation of sulfonic acid hydrazides is described, for example, by Curtius et al., in J. pr. Chem. 58, 166. The sulfonyl hydrazides are commercially available materials, which are useful as blowing agents. It will be obvious from this that the present hydrazides are relatively unstable compounds; in fact, they decompose at temperatures of from 100° to 200° C., more or less. Caution is, therefore, required in handling these materials, although they are operative in the present process, at temperatures below their decomposition points. As examples of presently useful sulfonic acid hydrazides may be listed, e.g., benzenesulfonyl hydrazide, p-chlorobenzenesulfonyl hydrazide, p-nitrobenzenesulfonyl hydrazide, 3,4-dichlorobenzenesulfonyl hydrazide, p-toluenesulfonyl hydrazide, 2,4-dimethylbenzenesulfonyl hydrazide, 3,4-dimethylbenzenesulfonyl hydrazide, α-toluenesulfonyl hydrazide, α-naphthalenesulfonyl hydrazide, cyclohexanesulfonyl hydrazide, tetrahydronaphthalenesulfonyl hydrazide, diethylaminosulfonyl hydrazide, methanesulonfyl hydrazide, propanesulfonyl hydrazide, indolesulfonyl hydrazide, etc. Sulfinic acid hydrazides or sulfohydrazidates, where obtainable, may also be employed in the present process.

Another class of presently useful acyl hydrazides comprises the acyl hydrazides derived from pentavalent phosphorus acids or their derivatives containing at least one carbon atom. The phosphorohydrazides are prepared, e.g., by reacting a chlorophosphorus or chlorothiophosphorus acid with hydrazine.

Particularly preferred in the present process are the phosphorohydrazidate esters, of the formula $$(RX)_2P(X)NHNH_2$$

where X is S or O, and R is an organic radical. Examples of such esters are dimethyl phosphorohydrazidate, diethyl phosphorohydrazidate, amyl hexyl phosphorohydrazidate, diphenyl phosphorohydrazidate, di-p-tolyl phosphorohydrazidate, dimethyl phosphorothiohydrazidate, diethyl phosphorothiohydrazidate, diphenyl phosphorothiohydrazidate, dicumyl phosphorothiohydrazidate, dimethyl phosphorotrithiohydrazidate, etc.

Another class of presently useful hydrazides of phosphorus-containing acids are the hydrazides derived from phosphonic and phosphinic acids, containing a C—P bond, such as dimethylphosphinyl hydrazide, bis(p-methoxyphenyl)phosphinyl hydrazide, methylethylphosphinothioyl hydrazide, etc., and 2-chloroethyl(2-chloroethyl)phosphonohydrazidate, etc.

Another class of phosphorus derivatives useful in the present process are the amidophosphoric acid hydrazides. Typical phosphorohydrazidic amides and diamides useful in the present process are of the formula

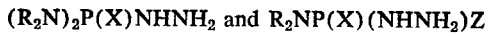

$$(R_2N)_2P(X)NHNH_2 \text{ and } R_2NP(X)(NHNH_2)Z$$

where R is an organic radical, X represents O or S, and Z represents another substituent, such as an alkoxy radical. Examples of these acyl hydrazides are N,N,N',N'-tetramethylphosphorohydrazidic diamide, N,N,N',N'-tetrakis(2-ethylhexyl)phosphorohydrazidic diamide, N,N,N',N' - tetrakis(2-nitro-4-methylphenyl)phosphorothiohydrazidic diamide, N,N,N',N' - tetrakis(p-chlorophenyl)phosphorohydrazidic diamide, 1,1'-(hydrazinophosphinyl)dipiperidine, phosphorohydrazidodiethylamidic chloride, etc. There may also be used mixed amidophosphorohydrazidic acids such as N,N-diphenyl-N',N'-dipropylphosphorohydrazidic diamide, derivatives of primary amines such as N,N'-dipropylphosphorothiohydrazidic diamide, etc.

In addition to all of the above-listed types of acyl hydrazides, the present invention is equally applicable to polyhydrazides, wherein multiple acid functions have been converted to hydrazide groups. Ordinarily, in this case, the terminal N atoms of each —$NHNH_2$ radical will be cyanoalkylated in the process. As examples of polyhydrazides may be listed, e.g., alkanedioic hydrazides such as adipyl hydrazide, arenedicarbonyl hydrazides such as terephthaloyl hydrazide, disulfonyl dihydrazides such as ethanedisulfonyl hydrazide, polyhydrazides of phosphorus acids or their derivatives such as phenyl phosphorodihydrazidate, etc.

In accordance with the present invention, acrylonitrile or crotononitrile is reacted with an acyl hydrazide to produce a 2-(2-cyanoalkyl)hydrazide.

When acrylonitrile is reacted with carbazic acid, there is obtained, for example, 3-(2-cyanoethyl)carbazic acid. When acrylonitrile is added to semicarbazide in accordance with the present process, there is obtained 1-(2-cyanoethyl)semicarbazide. When acrylonitrile is reacted with thiosemicarbazide, similarly, there is obtained 1-(2-cyanoethyl)thiosemicarbazide. In like manner, reaction of crotononitrile with the above hydrazides containing one carbon atom gives 3-(1-cyano-2-propyl)-carbazic acid, 1-(1-cyano-2-propyl)semicarbazide, and 1-(1-cyano-2-propyl)thiosemicarbazide.

Reaction of acrylonitrile with hydrazides of carboxylic acids gives, for example, aliphatic acid derivatives such as acetyl 2-(2-cyanoethyl)hydrazide, butyryl 2-(2-cyanoethyl)hydrazide, 2-ethylhexanoyl 2-(2-cyanoethyl)-hydrazide, palmitoyl 2-(2-cyanoethyl)hydrazide, etc. Substituted aliphatic acyl hydrazides with acrylonitrile and crotononitrile give, e.g., ethoxyacetyl 2-(2-cyanoethyl)-hydrazide, β-phenoxypropionyl 2-(2-cyanoethyl)hydrazide, N-(2-cyanoethyl)methylmalonohydrazidic acid, cyanoacetyl 2-(2-cyanoethyl)hydrazide, isoamylcyanoacetyl 2-(1-cyano-2-propyl)-hydrazide, etc. Alkenoyl hydrazides reacted with the present olefinic nitriles give, e.g., acrylyl 2-(2-cyanoethyl)hydrazide, hydrosorbyl 2-(1-cyano-2-propyl)hydrazide, etc.

Exemplary of alicyclic acid hydrazide reaction products with acrylonitrile or crotononitrile by the present method is bicyclo[2.2.1]heptane-2-carbonyl 2-(2-cyanoethyl)hydrazide.

Aralkanoyl hydrazide reaction products in accordance with the invention are typified by phenylacetyl 2-(2-cyanoethyl)-hydrazide, 3,4-dimethoxyphenylacetyl 2-(2-cyanoethyl)hydrazide, 2-nitro-4-chlorophenylacetyl 2-(2-cyanoethyl)hydrazide, β-phenyl-propionyl 2-(1-cyano-2-propyl)hydrazide, β-(p-methoxyphenyl)propionyl 2-(2-cyanoethyl)hydrazide, 9-phenanthrenepropionyl 2-(2-cyanoethyl)hydrazide, triphenylacetyl 2-(2-cyanoethyl)hydrazide, bis(p-hydroxyphenyl)acetyl 2-(2-cyanoethyl)hydrazide, m-nitrocinnamoyl 2-(2-cyanoethyl)hydrazide, etc.

Illustrative of aromatic acid derivatives obtainable by the present process are benzoyl 2-(2-cyanoethyl)hydrazide, o-toluyl 2-(1-cyano-2-propyl)hydrazide, 2,6-dichlorobenzoyl 2-(2-cyanoethyl)hydrazide, 3-nitro-5-methylbenzoyl 2-(2-cyanoethyl)-hydrazide, anisoyl 2-(2-cyanoethyl)hydrazide, salicyloyl 2-(2-cyanoethyl)hydrazide, p-(dimethylsulfamoyl)benzoyl 2-(2-cyanoethl)-hydrazide, 5,8-dibromo-2-naphthoyl 2-(2-cyanoethyl)hydrazide, 3,4-dimethoxy-9-phenanthrenecarbonyl 2-(2-cyanoethyl)hydrazide, pyrene-4-carbonyl 2-(2-cyanoethyl)hydrazide, etc.

Examples of heterocyclic acyl radicals in the present novel compounds are, e.g., 2,4-dimethyl-5-pyrroleacetyl 2-(2-cyanoethyl)hydrazide, 2-(p-methoxyphenyl)-5-pyrrolepropionyl 2-(2-cyanoethyl)hydrazide, 3,4-dichloro-2-methylpyrrole-5-carbonyl 2-(1-cyano-2-propyl)hydrazide, 3-indolepropionyl 2-(2-cyanoethyl)- hydrazide, 2-tetrahydrofuranpropionyl 2-(2-cyanoethyl)hydrazide, 2-phenyl-5-furanpropionyl 2-(2-cyanoethyl)hydrazide, 3-furoyl 2-(2-cyanoethyl)hydrazide, thiophene-2-carbonyl 2-(2-cyanoethyl)-hydrazide, 2-(p-methoxyphenyl)-4 - thiazolepropionyl 2-(1-cyano-2-propyl)hydrazide, 6-methylnicotinoyl 2-(2-cyanoethyl)hydrazide, 4-chloropicolinyl 2-(2-cyanoethyl)hydrazide, etc.

Illustrative of the present novel products derived from a carbamyl hydrazide are dimethylcarbamyl 2-(2-cyanoethyl)hydrazide, phenylcarbamyl 2-(2-cyanoethyl)hydrazide, ethylphenylcarbamyl 2-(2-cyanoethyl)hydrazide, methyl-o-tolylcarbamyl 2-(1-cyano-2 - propyl)hydrazide, β-naphthylcarbamyl 2-(2-cyanoethyl)hydrazide, methylthiocarbamyl 2-(2-cyanoethyl)hydrazide, phenylthiocarbamyl 2-(2-cyanoethyl)hydrazide, etc.

Products of the reaction of sulfonic acid hydrazides with the present nitriles by the method of this invention are, e.g., methanesulfonyl 2-(2-cyanoethyl)hydrazide, cyclohexanesulfonyl 2-(2-cyanoethyl)hydrazide, benzenesulfonyl 2-(1-cyano-2-propyl)hydrazide, cumenesulfonyl 2-(2-cyanoethyl)hydrazide, 4-chloro-1 - naphthalenesulfonyl 2-(2-cyanoethyl)hydrazide, tetrahydronaphthalenesulfonyl 2-(2-cyanoethyl)hydrazide, diethylaminosulfonyl 2-(2-cyanoethyl)hydrazide, etc.

The products of the reaction of acrylonitrile or crotononitrile with phosphoric hydrazides are another class of novel compounds afforded by the present invention. Exemplary of reaction products of phosphorohydrazidate esters is dimethyl N-(2-cyanoethyl)-phosphorohydrazidate, of the structure

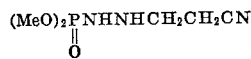

Other N-(cyanoalkyl)phosphorohydrazidate esters similarly obtainable are dialkyl esters such as bis(2-ethylhexyl) N-(2-cyanoethyl)-phosphorohydrazidate, diaralkyl esters such as dibenzyl N-(2-cyanoethyl)phosphorohydrazidate, dicycloalkyl esters such as dicyclohexyl N-(2-cyanoethyl)phosphorohydrazidate, and diaryl and di(alkaryl) esters such as di-p-tolyl N-(1-cyano-2-propyl)phosphorohydrazidate, bis(p-chlorophenyl) N-(2-cyanoethyl)-phosphorohydrazidate, bis (p-methoxyphenyl) N-(2-cyanoethyl)phosphorohydrazidate, etc. Thiophosphorohydrazidates similarly obtainable are, e.g., dimethyl N-(2-cyanoethyl)phosphorohydrazidothioate, diphenyl N-(1-cyano-2-propyl)phosphorohydrazidothioate, bis(p-methoxybenzyl) N-(2-cyanoethyl)phosphorohydrazidothioate, bis(2-chloroethyl) N-(2-cyanoethyl)phosphorohydrazidothioate, etc.

Exemplary of phosphonic and phosphinic acid derivatives provided by the present invention are dimethylphosphenyl 2-(2-cyanoethyl)hydrazide, bis(p-tolyl)phosphinyl 2-(1-cyano-2-propyl)hydrazide, di(4 - biphenylyl)phosphinyl 2-(2-cyanoethyl)hydrazide, bis(2-cyanoethyl)-phosphinyl 2-(2-cyanoethyl)hydrazide, (ethoxymethyl)(phenyl)phosphinyl 2-(2-cyanoethyl)hydrazide, bis(dimethylaminophenyl)phosphinyl 2-(2 - cyanoethyl)hydrazide, ethyl N-(2-cyanoethyl)phenylphosphonohydrazidate, etc. Thio anologs of the above which may be obtained in accordance with the present invention are, e.g., diethylphosphinothioyl 2-(2-cyanoethyl)hydrazide, diphenylphosphinothioyl 2-(2-cyanoethyl)hydrazide, phenylbenzylphosphinothioyl 2-(2-cyanoethyl)hydrazide, etc.

Another class of phosphorus hydrazide derivatives which are afforded by the present invention are the phosphorohydrazidic amides. For example, by the react of acrylonitrile with N,N,N',N'-tetramethylphosphorodrazidic diamide, there is obtained a compound of structure

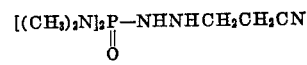

which may be named N''-(2-cyanoethyl)-N,N,N', tetramethylphosphorohydrazidic diamide. Simila from crotononitrile and N,N-dimethyl-N',N'-diphei phosphorohydrazidic diamide, there may be obtained 1 (1-cyano-2-propyl)-N,N-dimethyl - N',N' - diphenylpl phosphorohydrazidic diamide. Other examples of this t of product are N,N,N',N'-tetrakis(p-chlorobenzyl)-] (2-cyanoethyl)phosphorohydrazidic diamide, N''-(2 anoethyl)-N,N,N',N'- tetramethylphosphorohydrazido oic diamide, etc. Similarly, a representative produc cyanoalkylation of a phosphoramidohydrazidate este ethyl N'-(2-cyanoethyl)-N,N-dimethylphosphoramidc drazidate.

Another class of the presently afforded hydrazine rivatives are those derived from dihydrazides. As ex plary of acyl dihydrazides wherein the acyl radicals minate in carbon atoms doubly bonded to oxygen or fur, cyanoalkylated in accordance with the present p ess, may be listed, e.g., 1,5-bis(2-cyanoethyl)carb drazide, oxalyl 2-(2-cyanoethyl)hydrazide, adipyl 2 cyanoethyl)hydrazide, cyanosuccinyl 2-(2-cyanoethyl drazide, trans-cyclohexane-1,4-dicarbonyl 2-(2-cyanc yl)hydrazide, terephthaloyl 2-(2-cyanoethyl)hydra benzene-1,4-bis[thiocarbamyl 2 - (2 - cyanoethyl)hy zide], etc. Examples of disulfonyl dihydrazide de tives prepared in accordance with the present inver are, e.g., butane-1,4-disulfonyl 2-(2-cyanoethyl)h) zide, benzene-1,3-disulfonyl 2-(2-cyanoethyl)hydra oxybis[benzenesulfonyl 2-(2-cyanoethyl)hydrazide], clohexane-1,4-disulfonyl 2-(1-cyano-2-propyl)hydra etc. Examples of presently afforded dihydrazide ] phorus compounds are, e.g., ethyl N,N''-bis(2-cyan) yl)phosphorodihydrazidate, of the formula

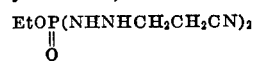

phenylphosphinyl bis [2-(2-cyanoethyl)hydrazide] the formula

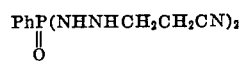

N,N-diisopropyl-N',N'''-bis(2 - cyanoethyl)phosphc hydrazidothioic amide, of the formula

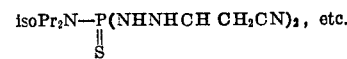

In carrying out the present reaction the α,β-ol nitrile, i.e., acrylonitrile or crotononitrile, is simply tacted with the chosen acyl hydrazide. Heat may b ployed to accelerate the reaction; however, althoug hydrazides are relatively stable compounds, they m: compose at elevated temperatures, and the reaction s accordingly be conducted with caution. Advantage a solvent or diluent is added, e.g., to dissipate th( of reaction, and the solvent-containing mixture, aft reactants have been completely contacted, is heatec to reflux, to complete the reaction. Application of atmospheric pressure to the reaction is generally 1 essary, but may be employed to facilitate the p: Since the preparation of the present cyanoalkylat( drazides involves addition of one equivalent of tl finic nitrile to one equivalent of the acyl hydrazid preferred that approximate stoichiometric equivale the reactants should be present in the reaction m However, if desired, an excess of the more readily able constituent may be employed. The present r( proceeds readily and does not generally require ca ut catalysts may be employed if desired. As examples of basic cyanoalkylation catalysts may be listed, e.g., aqueous potassium hydroxide, Triton-B, etc. Acidic catalysts are preferred in the present application. Examples of acidic catalysts for the present reaction are acetic acid, chloroacetic acid, sulfuric acid, salts of metals capable of forming ammoniates such as zinc, copper, nickel, cobalt, etc., e.g., zinc sulfate. Since acrylonitrile is a readily polymerizable material, it is generally advantageous to conduct the addition reaction in the presence of an inhibitor of polymerization such as hydroquinone; copper salts, such as copper acetate, may both inhibit polymerization and promote the cyanoethylation reaction. The reaction products can be isolated by conventional means, e.g., distillation, precipitation, and filtration, etc.

The present 2-(2-cyanoalkyl)hydrazides are stable compounds ranging from high-melting solids to liquids. They are useful for a variety of agricultural and industrial purposes. The present sulfonyl compounds may, for example, be oxidized to the corresponding azo compounds to give potential blowing agents. Long-chain hydrazides such as long-chain fatty acid hydrazides, e.g., stearoyl 2-(2-cyanoethyl)hydrazide, may be used as surface-active agents, e.g., as textile assistants. Lower alkanoyl 2-(2-cyanoethyl)hydrazides may be used as rubber additives, e.g., vulcanization agents, softeners, anti-oxidants, etc. The aromatic acyl hydrazides are catalysts for the polymerization of olefinic monomers. Thiocarbazides may be used in conjunction with anti-oxidants as stabilizers, e.g., of fats, oils, etc. Addition of the present compounds to fuels may produce ignition-improving qualities. The present compounds are particularly useful as biological toxicants; for example, they may be used as pharmaceuticals or as nematocides, insecticides, fungicides, etc. Especially potent biological toxicants are, for example, the present phosphorus compounds. In addition, the novel compounds afforded by this invention are useful chemical intermediates.

The invention is illustrated, but not limited, by the following examples:

*Example 1*

This example illustrates the preparation of a cyanoalkylated phosphorohydrazide.

Diethyl phosphorohydrazidate was prepared by treating 106 g. of diethyl hydrogen phosphite in 200 ml. of carbon tetrachloride and 300 ml. of absolute alcohol, at 5° C., with 67 g. of anhydrous hydrazine. The reaction mixture was then filtered to remove precipitate and the filtrate distilled to remove solvents, up to 60° C./3 mm. The residue represented substantially pure diethyl phosphorohydrazidate, $n_D^{25}$ 1.4530.

The crude hydrazide prepared as described above was stirred at room temperature, with cooling to hold the reaction mixture temperature between 35° and 40° C., while 53 g. (1.0 mole) of acrylonitrile was added gradually over the period of an hour. The yellow solution which formed was stirred for an additional hour and then subjected to vacuum distillation to remove unreacted acrylonitrile. The remaining somewhat viscous yellow solution was diethyl N-(2-cyanoethyl)phosphorohydrazidate, $n_D^{25}$ 1.4672.

*Example 2*

This example describes the preparation of a carbonyl hydrazide.

One hundred grams of hydrazine hydrate were added to 148 g. (2.0 moles) of methyl acetate, with stirring, over one and one-half hours. The reaction mixture was then heated to 70–80° C. for an hour, cooled, and distilled. After removal of methanol, water, and unreacted starting materials, there were obtained 123 g. of acetyl hydrazide, $B_{18}$ 125–130° C.

A solution of the 123 g. (1.66 moles) of acetyl hydrazide in 500 ml. of dioxane at an initial temperature of 40° C. was slowly mixed with 88 g. (1.66 moles) of acrylonitrile. The solution, after stirring for one hour at room temperature, was refluxed for two and one-half hours and then cooled. Distillation, after removal of the dioxane and unreacted starting materials, gave 68.8 g. of a fraction, B. 170–190° C./1.0 mm., $n_D^{25}$ 1.4889. The pot residue was a red, water-soluble tar. The fraction boiling at 170–190° C. was diluted with ether. The precipitate which formed was filtered off and on further dilution, the filtrate formed an uncrystallizable oil. The filtrate was again distilled, to give 25 g. of acetyl 2-(2-cyanoethyl)hydrazide, in the form of a yellow oil, B. 160–170° C./0.4 mm.

*Example 3*

Carbamyl cyanoalkylhydrazides may be prepared similarly. Thus, employing the procedure of Example 1, but replacing the phosphorohydrazidate by an equimolar proportion of m-chlorophenylcarbamyl hydrazide, there is obtained m-chlorophenylcarbamyl 2-(2-cyanoethyl)hydrazide, a difficultly crystallizable compound, light tan needles from ethanol-water, M. 115–116° C., containing 23.61% N ($C_{10}H_{11}ClN_4O$ requires 23.4% N). The identity of the product was confirmed by infrared analysis.

*Example 4*

This example illustrates the cyanoalkylation of a sulfonyl hydrazide, wherein two acyl hydrazide groups are present, and wherein the acyl radical contains a non-interfering functional group in addition to the sulfonyl radical.

p,p′-Oxybis(benzenesulfonyl hydrazide) (17 g., 0.0475 mole) was gently refluxed with 53 g. (1.0 mole) of acrylonitrile for two hours. The white solid product formed was filtered off and dried; it weighed 17.2 g. An additional 1.3 grams of product were recovered by concentration of the filtrate. The product was a hard, coherent, white solid, which neither melted nor decomposed at up to 220° C. Identification of the product as oxybis[benzenesulfonyl 2-(2-cyanoethyl)hydrazide] was confirmed by infrared analysis, which indicated the presence of CN and absence of $NH_2$ groups.

Similarly, by the reaction of chloroacetyl hydrazide with acrylonitrile, there may be prepared chloroacetyl 2-(2-cyanoethyl)-hydrazide; by the reaction of oxalyl hydrazide with crotononitrile, there may be prepared oxalyl 2-(1-cyano-2-propyl)hydrazide, etc.

The utility of the present compounds is illustrated by the following example:

*Example 5*

The sand in which were potted three plants of four- to five-week old individually potted tomato plants, each having four true leaves at least one and one-half inches long, was treated with 30 ml. per pot of a one hundred parts per million emulsion of diethyl N-(2-cyanoethyl)-phosphorohydrazidate for three successive days. On the fourth day, the three plants and a control, untreated plant, were uprooted. About one-third of the root system of each plant was torn off, and the roots, after washing in water, were immersed in a suspension of a culture of *Fusarium oxysporum lycopersici*. The plants were repotted in fresh sand and permitted to develop until the control showed marked disease symptoms. The plants were then unpotted and the extent of fusarium wilt disease in each plant was evaluated by examination of the vascular discoloration in each root node. It was found that very promising systemic control of the fusarium wilt disease was obtained on the plants treated with the hydrazidate. Repetition of the test using a ten parts per million concentration of the diethyl N-(2-cyanoethyl)phosphorohydrazidate again demonstrated excellent control of the fusarium fungus infection.

The present compounds may be applied to soils, e.g., in irrigation water, to produce the present systemic fungitoxicant effects. Since very low concentrations of the active material are needed to produce effective results, the compounds are preferably diluted in a carrier material before application. Examples of suitable carrier materials are solvents, emulsions, and powdered dusts. As powdered materials suitable for the preparation of dusts, to be applied to the soil for slow release of the present fungicidal compound, there may be used, e.g., talc. bentonite, etc. Particularly useful in the treatment of large areas are oil-in-water emulsions of the present compounds (where by oils are meant organic liquids substantially insoluble in water). The active material is dissolved in an organic solvent such as kerosene and mixed with an emulsifying agent to prepare concentrated preparations suitable for ready mixing with water to form dilute emulsions at the point of application. Suitable emulsifying agents are, e.g., soaps such as sodium laurate, polyglycol monoethers with long-chain fatty alcohols, such as the reaction products of oleyl alcohol and excess ethylene oxide, cationic emulsifying agents such as trimethylcetylammonium iodide, etc.

While the invention has been described with reference to particular modes of operation and particular compounds afforded by this invention, other modifications will be readily obvious to those skilled in the art and what is intended is that the present invention is to be limited only as described in the appended claims.

What is claimed is:

1. The method which comprises contacting an organic carboxylic acid hydrazide having not more than about 20 carbon atoms with acrylonitrile and isolating from the resulting reaction product a carbonyl 2-(2-cyanoethyl)hydrazide of the formula

where R is an organic radical having not more than about 20 carbon atoms and bonded by carbon to the carbonyl carbon atom.

2. The method which comprises contacting an alkanoyl hydrazide having not more than about 20 carbon atoms with acrylonitrile and isolating from the resulting reaction product an alkanoyl 2-(2-cyanoethyl)hydrazide having not more than about 20 carbon atoms in the alkanoyl group.

3. Alkanoyl 2-(2-cyanoethyl)hydrazides of the formula

where R is an alkyl radical having not more than about 20 carbon atoms.

4. The method which comprises contacting acetyl hydrazide with acrylonitrile and isolating from the resulting reaction product acetyl 2-(2-cyanoethyl)hydrazide.

5. Acetyl 2-(2-cyanoethyl)hydrazide.

6. N-(2-cyanoethyl)phosphorohydrazidate esters of formula

where $R_1$ and $R_2$ are hydrocarbon radicals each having not more than about 20 carbon atoms and bonded to the oxygen atoms by carbon.

7. The method which comprises contacting acrylonitrile with a dialkyl phosphorohydrazidate having not more than about 20 carbon atoms per alkyl group and isolating from the resulting reaction product a dialkyl N-(2-cyanoethyl)phosphorohydrazidate ester having not more than about 20 carbon atoms per alkyl group.

8. Dialkyl N - (2 - cyanoethyl)phosphorohydrazidate esters having not more than about 20 carbon atoms per alkyl group.

9. The method which comprises contacting diethyl phosphorohydrazidate with acrylonitrile and isolating from the resulting reaction product diethyl 2-(2-cyanoethyl)phosphorohydrazidate.

10. Diethyl N-(2-cyanoethyl)phosphorohydrazidate.

11. The method which comprises contacting p,p'-oxybis(benzenesulfonyl hydrazide) with acrylonitrile and isolating from the resulting reaction product p,p'-oxybis-[benzenesulfonyl 2-(2-cyanoethyl)hydrazide].

12. p,p'-Oxybis[benzenesulfonyl 2 - (2 - cyanoethyl)-hydrazide].

13. The method which comprises contacting acrylonitrile with m-chlorophenylcarbamyl hydrazide and isolating from the resulting reaction product m-chlorophenylcarbamyl 2-(2-cyanoethyl)hydrazide.

14. m - Chlorophenylcarbamyl 2 - (2 - cyanoethyl)hydrazide.

15. The method which comprises contacting an alphaolefinic nitrile of the formula RCH=CHCN where R is selected from the class consisting of hydrogen atoms and the methyl radical, with an acyl hydrazide selected from the class consisting of compounds of the formulas

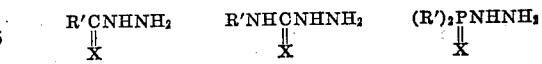

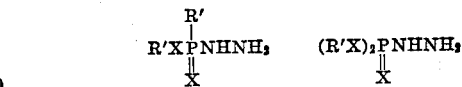

$O(R'SO_2NHNH_2)_2$ and $R'SO_2NHNH_2$, where R' is selected from the class consisting of hydrocarbon radicals and chlorinated hydrocarbon radicals having no more than about 20 carbon atoms, and X is selected from the class consisting of sulfur and oxygen, and isolating from the resulting reaction product an acyl 2-(2-cyanoalkyl)hydrazide selected from the class consisting of compounds of the formulas

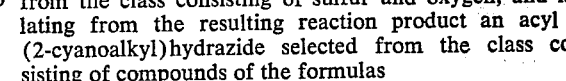

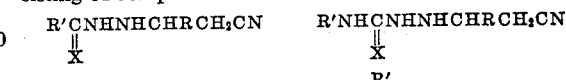

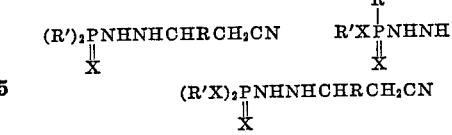

$O(R'SO_2NHNHCHRCH_2CN_2)$ and $R'SO_2NHNHCHRCH_2CN$, where R, R' and X are as defined hereinabove.

16. An acyl 2-(2-cyanoalkyl)hydrazide selected from the class consisting of compounds of the formulas

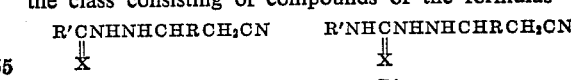

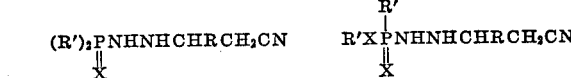

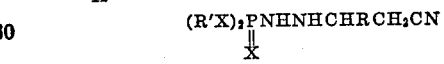

$O(R'SO_2NHNHCHRCH_2CN)_2$ and $R'SO_2NHNHCHRCH_2CN$, where R is selected from the class consisting of hydrogen atoms and the methyl radical, X is selected from the class consisting of sulfur and oxygen and R' is selected from the class consisting of hydrocarbon radicals and chlorinated hydrocarbon radicals having not more than about 20 carbon atoms.

References Cited in the file of this patent
UNITED STATES PATENTS 2,527,510   Allen et al. ———————— Oct. 31, 19
2,580,919   Howard ———————————— Jan. 1, 19

UNITED STATES PATENT OFFICE
CERTIFICATE OF CORRECTION

Patent No. 2,909,556            October 20, 1959

Samuel Allen Heininger

It is hereby certified that error appears in the above numbered patent requiring correction and that the said Letters Patent should read as corrected below.

Column 2, line 33, for "α-benzamido-β-phenylpropionyl hydrazide" read -- 3,4-dimethoxyphenylacetyl hydrazide --; column 3, line 39, for "methanesulonfyl" read -- methanesulfonyl --; column 6, line 52, the right-hand portion of the formula should appear as shown below instead of as in the patent:

$$(NHNHCH_2CH_2CN)_2$$

column 10, line 48, for "$CN_2$)" read -- $CN)_2$ --.

Signed and sealed this 12th day of September 1961.

(SEAL)
Attest:

ERNEST W. SWIDER
Attesting Officer

DAVID L. LADD
Commissioner of Patents
USCOMM-DC